April 16, 1957 E. L. McFERREN 2,788,716
MACHINE TOOL FRAME AND WAY CONSTRUCTION
Filed April 13, 1953 3 Sheets-Sheet 1

INVENTOR
Edgar L. McFerren
Carlson, Pitzner, Hubbard & Wolfe
ATTORNEY

April 16, 1957     E. L. McFERREN     2,788,716
MACHINE TOOL FRAME AND WAY CONSTRUCTION
Filed April 13, 1953     3 Sheets-Sheet 2
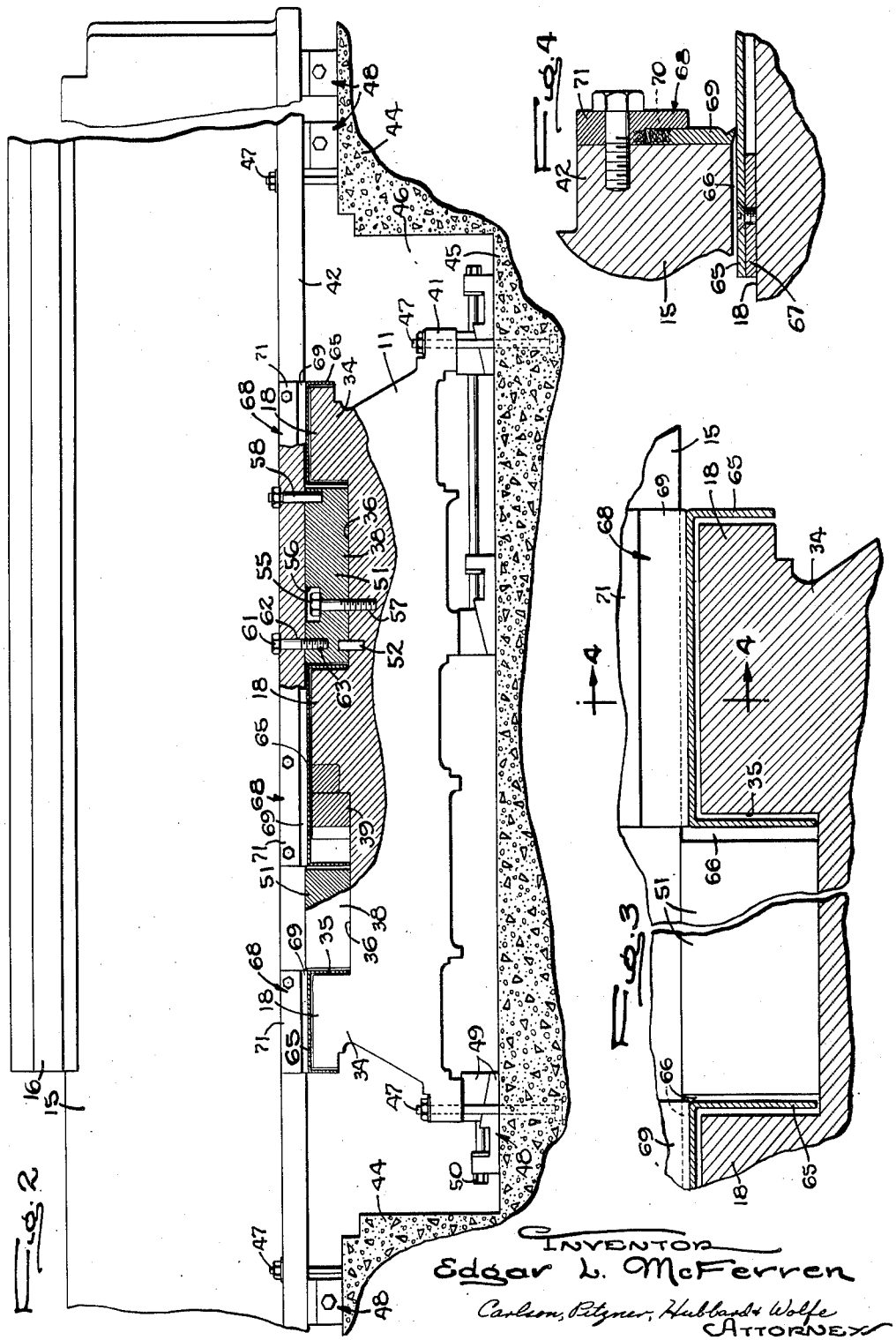

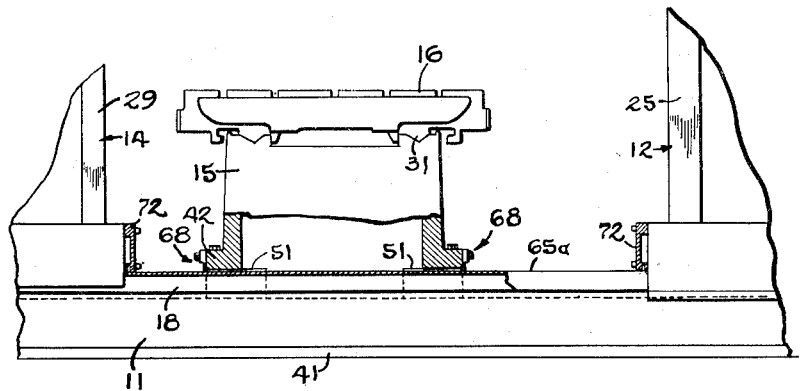
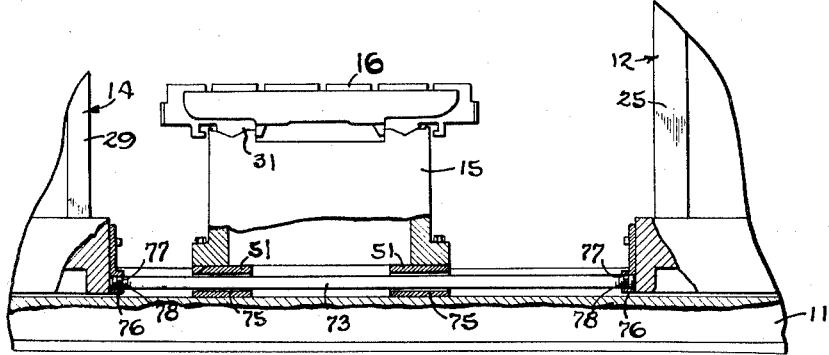

United States Patent Office 2,788,716
Patented Apr. 16, 1957

2,788,716

MACHINE TOOL FRAME AND WAY CONSTRUCTION

Edgar L. McFerren, Fond du Lac, Wis., assignor to Giddings & Lewis Machine Tool Company, Fond du Lac, Wis., a corporation of Wisconsin Application April 13, 1953, Serial No. 348,331

8 Claims. (Cl. 90—11)

The present invention relates to machine tools and more specifically to a new and improved machine tool frame and way construction for machine tools having opposed tool supports movable on alined ways, and a work support movable transversely between the tool supports, as in horizontal boring, drilling and milling machines.

A general object of the present invention is to provide a novel and improved frame and way construction of a sturdy, rigid character for machine tools of the foregoing general type, in which the tool supports and the work table move in mutually intersecting paths. Another object is to increase the accuracy of alinement of the tool and work supports while simplifying and reducing the manufacturing and installation costs of the machine tool.

It is a related object of the present invention to provide an improved frame and way construction for a machine tool of the foregoing type having elements moving crosswise of each other in intersecting paths in which guideways of integral construction are provided in each direction of movement and are protected by a novel and simple way guard arrangement.

A further object is to provide for imparting unitary movement to tool supports on a machine of the foregoing type even though the tool supports may be located on opposite sides of the path of a worktable moving between them.

Other objects and advantages of the invention will become apparent as the following detailed description proceeds, taken in connection with the accompanying drawings, in which:

Fig. 2 is a partial end elevation of the machine tool with the tool support columns removed and the tool support bed partially in section to show the spacer block construction.

Fig. 3 is a partial vertical section of the way and way guard taken along the line 3—3 of Figure 1.

Fig. 4 is a vertical section of the way guard wiper construction, taken along the line 4—4 of Fig. 3.

Fig. 5 is a partial elevation in cross section illustrating a modified form of the invention.

Fig. 6 is a partial elevation in cross section illustrating another modified form of the invention.

Figure 1:
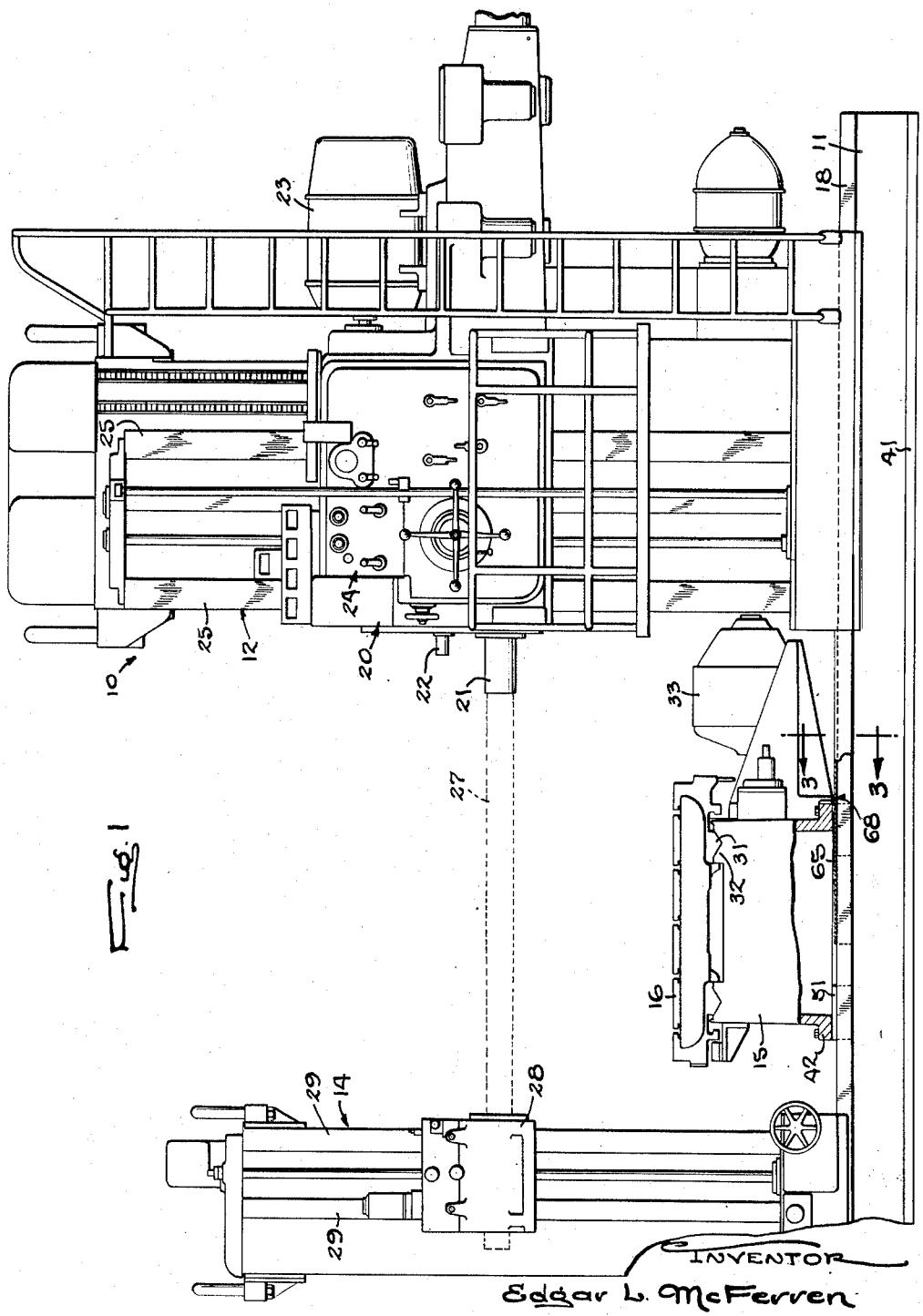
Figure 1 is a front elevation of a horizontal boring, drilling and milling machine embodying the features of the invention.

While certain particular embodiments of the invention have been shown in the drawings and described herein in some detail, there is no intention to limit the invention to such specific embodiments. On the contrary, the intention is to cover all modifications and alternative constructions falling within the spirit and scope of the invention, as expressed in the appended claims.

Referring now to the drawings, the invention is shown embodied in a machine tool 10 of the type commonly known as a horizontal boring, drilling and milling machine. In overall organization, the tool comprises a main bed frame 11 supporting a headstock column 12 and a tailstock column 14. Positioned crosswise of the main bed 11 and intermediate the headstock and tailstock columns 12, 14 is a transverse bed frame 15 which carries a reciprocable worktable 16. Guideways 18 on the upper surface of the main bed 11 provide bearing surfaces for slidably moving the headstock and tailstock columns 12, 14 to and from the worktable 16.

Carried by the headstock column 12 for supporting and driving the cutting tools is a headstock 20 of well-known construction. In the illustrated machine tool, the headstock 20 is provided with a main spindle 21, an auxiliary spindle 22, spindle drive motor 23 and control panel 24. The operation and arrangement of the headstock, being well-known and understood, need not be described in detail. Suffice it to say for an understanding of the present invention, the main and auxiliary spindles 21, 22 project horizontally from the headstock 20 in the direction of the worktable 16 and are mounted on the headstock for relative horizontal movement. To provide vertical adjustment of the spindles 21, 22 relative to the worktable, a set of vertical ways 25 is formed on one side of the headstock column to provide for up and down movement of the headstock 20.

The projecting ends of the tool spindles 21, 22 are adapted, as with a taper sleeve or face plate, to receive and support a cutting tool, or a tool carrying arbor or boring bar 27, shown in dot-dash outline. The free or outboard end portion of the arbor or boring bar 27 is journaled in a tailstock bearing block 28 mounted on the tailstock column 14. The tailstock column 14 is provided with a set of vertical ways 29 to permit vertical adjustment of the tailstock. Preferably, the vertical positioning of the tailstock and headstock are synchronized so that horizontal alinement of the headstock spindle and tailstock bearing is maintained.

It is important for precision machining that the headstock and tailstock columns 12, 14 be accurately and precisely alined both as to vertical cant and horizontal twist. Misalinement in either direction will not only cause binding of the bearing surfaces for the tool supports, but also makes precise movement of a cutting tool relative to the table 16 impossible. It will also be appreciated that the vertical ways 25, 29 on the headstock and tailstock columns must be alined throughout their entire length to provide accurate alinement of the headstock 20 and tailstock 28 at all positions of vertical adjustment.

Accurately alined movement of the worktable 16 relative to the headstock spindles 21, 22 and the cutting tools is also required for precision machining operations. As shown in the drawings, accurately machined V ways 31 on the transverse bed 15 and complementary ways 32 on the bottom of the table 16 slidably support the table for movement to and fro crosswise of the main column support bed 11. A separate drive motor 33 operating through suitable gearing (not shown) drives the table in a reciprocating cycle past the headstock column and tool spindles.

To provide for the crosswise, intersecting movement of the table and the tool columns, prior constructions have resorted to complicated bed and way constructions of high manufacturing cost and to multiple piece construction in which one or both of the beds were made in sections with resulting expensive and difficult installation. Moreover, the prior constructions lacked rigidity and precise alinement except at great effort and expenditure of time and money.

In carrying out the present invention, a rigid frame and way construction of simple manufacture and permitting accurate alinement of the tool columns and worktable is provided. This is accomplished by forming each of the crosswise beds as a separate, integral casting of simple, rectilinear shape and providing means for superposing one unit in accurately determined relation above the other unit in cruciform arrangement without interrupting the ways of either unit.

The tool support or main bed 11 in the illustrated embodiment of the invention is provided with three spaced, flat parallel ways 18 formed on three upright, ribs or projections 34 extending longitudinally from end to end of the bed. The inner side walls 35 of the ribs and top surface 36 of the bed define a pair of rectangular recesses 38 separating the ribs and ways from each other. With the present construction, the ways 18 and recesses 38 therebetween, can be machined for their complete length in one continuous operation to insure accurate alinement of the ways for both the headstock and tailstock columns 12, 14 which are supported on opposite end portions of the bed 11.

Along one side of the central rib or projection 34, a gear rack 39 is pinned or otherwise rigidly fixed to the main bed for engagement by gear pinions (not shown) on the headstock and tailstock columns. The pinions may be hand or power actuated in any desired manner, for moving the headstock and tailstock columns along the ways longitudinally of the bed.

The table bed ways 31 are also continuous from end to end of the bed 15 for reciprocably supporting the worktable 16. The table bed ways 31, as well as the column supporting ways 18, previously described, may be machined in one operation over their entire length for accurate reciprocating movement of the worktable at all positions of travel.

Rigidity and simplicity of the present frame construction are enhanced by the sturdy rectilinear or block form of the main and table beds 11, 15. As already described, the top faces of the beds are plane, continuous surfaces, and with reference to the drawings, it will be seen that the bottoms of the beds likewise are straight, continuous surfaces. Positioned at the bottom side edges of the beds are continuous mounting flanges or feet 41, 42 providing uninterrupted support for the beds.

A foundation or base for a machine tool frame embodying the present invention is of a two level construction. Preferably the transverse or table bed 15 is mounted on a foundation 44 which is substantially level with the working floor, and the main bed is placed on sunken foundation or base 45. This construction has the advantage of placing the worktable 16 at a convenient working height. As shown in Fig. 2, a trench or pit 46, having a length and breadth somewhat larger than the corresponding dimensions of the main bed 11, is provided, to receive the bed. The pit 46 preferably has a depth substantially equal to the height of the main bed so that the ways of the main bed are even with or slightly above the foundation for the table bed when leveling blocks 48 are used. As an alternative foundation construction, the main bed 11 may be mounted on the working floor and suitable raised platforms provided on either side for the transverse table bed 15.

A plurality of adjustable leveling blocks 48 of conventional design are placed at spaced intervals under the mounting flanges or feet 41, 42 of the respective beds to compensate for variations in height of the foundation or floor. As shown in the drawings, the blocks comprise a mating pair of oppositely faced wedges 49, having an adjusting screw 50 for pulling the blocks relative to each other so that greater or less height is obtained by forcing the wedges toward or away from each other.

For accurate, relative positioning of the main and table beds 11, 15 upon installation of frame, means are provided to insure positive vertical and horizontal alinement of the beds. This is accomplished in the exemplary construction by spacers 51 comprising accurately machined metal blocks which are inserted in the recesses 38 between the ways 18 on the main bed. In the illustrated construction four such spacers 51 are provided, two in each recess spaced apart to lie under the mounting flanges or feet 42 on opposite sides of the table bed. The spacers thus rest on the bottom wall of the recess and in turn provide support for the portion of the table bed overlying the main bed. The table bed consequently has no tendency to sag or deflect even though in bridging relation to the main bed.

The spacers 51 are positively positioned against twisting relative to the main bed by means of locating pins 52 received in closely fitting, alined holes in the bottom of the spacer 51 and the lower wall 36 of the recess. Upward displacement of the spacers is prevented by bolts 55 passing through counterbored holes 56 in the spacer and received in threaded holes 57 in the lower wall of the recess 38.

The transverse or table bed 15 is similarly positively positioned relative to the spacers 51, and to the main bed 11, by a second set of locating pins 58 received in closely fitting, alined holes in the overlying portions of the mounting flanges 42 on the table bed 15 and in the top portion of the spacers. Bolts 61 passing through holes 62 in the mounting flanges 42 and threaded into tapped holes 63 in the spacers hold the table bed in firm contact with the spacers.

Upon installation of the machine tool, the main or column supporting bed 11 is first installed and mounted on its foundation 45. After it has been positioned and the leveling blocks 48 adjusted to allow for deviations in the surface of the foundation or floor, the transverse or table bed 15 is lowered into position. That position is accurately and precisely determined vertically by the height of the spacer blocks 51 and horizontally by the location of the locating pins 52, 58 in the spacer blocks. The leveling blocks 48 for the table bed 15 are then adjusted to compensate for unevenness of the foundation or floor 44.

As a further feature of the present invention, provision is made for a novel way guard construction of strong and simple form. In order to protect the highly finished column support ways 18 against damage from chips and dirt, way guards 65 of inverted channel shape are placed over the top of the ways with the legs of the channel extending downwardly along the sides of the ways. So that the guards themselves will not damage the ways, they are held in spaced relation to the ways 18 by rigidly attaching one end of the guards to the headstock column immediately above the surface of the ways.

For adequate protection the guards should cover the entire area of the ways between the headstock column and the table bed. With the column movable toward and from the bed this area increases and decreases in length. To provide for such movement and still keep the ways covered at all times, a clearance space 66 is provided around the top and side surfaces of the ways to permit the way guards 65 to project under the table bed 15. In the present instance such clearance space 66 is provided by making the spacer blocks 51 of slightly greater height and smaller width than the corresponding dimensions of the recesses 38. It will therefore be seen that the spacer blocks 51 project above the ribs 34 with the lower edges of the table bed 15 spaced above the tops of the ways 18 to provide free passage of the way guards 65. The projecting ends of the guards can move to and fro under the table bed and alongside the spacer blocks as the headstock column is moved and thus keep the ways fully protected and covered. With this construction, the way guards 65 can be formed of a single, rigid piece of metal, since the guards have ample space in which to move without interference.

To prevent chips and dirt on the upper side of the way guards from slipping under the table bed, and possibly working their way over the projecting ends of the guards onto the way surfaces, wipers 68 are provided on the lower edges of the table bed mounting flanges 42. As shown in Figs. 3 and 4, the wipers are short bars 69 positioned to extend transversely across the upper surfaces of the way guards 65. For efficient wiping action, the lower edge of the wiper strip is beveled to form a thin wiping edge which is resiliently pressed by coil springs 70 against the top of the way guard. An inverted L shaped guide strip 71 is bolted to the side of the mounting flange 42 in overlying relation to the wiper bar 69. The base of the guide 71 serves as an abutment for the coil springs 70 and also serves to space the vertical leg of the guide strip outwardly from the mounting flange to form a vertical slot for slidably holding the wiper strip 69 in position.

A modified construction of the present invention is shown in Fig. 5, in which the way guard construction just described is utilized not only to protect the ways but also to provide for unitary movement of the headstock and tailstock columns. In this illustrative embodiment, way guards 65a are provided which extend over the ways for the entire distance from the headstock column 12 to the tailstock column 14 by virtue of the clearance spaces 66 between the main and table beds. Provision is made on the end portions of the way guards 65a for attachment of their respective ends to the headstock and tailstock columns. In the specific form illustrated, this is done by forming external flanges 72 on the ends of the guards, which in turn are bolted to the columns 12, 14. This arrangement provides for movement of the two columns as a unit and greatly increases the effective use of the machine tool since longitudinal adjustment of the columns can be made without disturbing the support for an arbor or tools positioned between the headstock and tailstock.

It will also be appreciated that the modified form of Fig. 5 also provides a strong way guard construction. Possible downward bending of the projecting ends of the way guards into contact with the ways, as by workmen standing on the guards or heavy objects falling on them, is prevented by the double support provided. In this form of construction, a second wiper 68 for the way guards may be used on the side of the table bed facing the tailstock column.

A further modified construction is illustrated in Fig. 6 of the drawings in which unitary motion between the headstock and tailstock columns is accomplished by means of a cylindrical bar or connector rod 73 fastened at opposite ends to the respective columns. Preferably, two such bars or connector rods 73 are used, one positioned in each of the recesses 38 and extending longitudinally between the columns 12, 14. Passages 75 of suitable cross section are provided through the spacer blocks 51 to permit the bars to slide freely in an axial direction within the recesses 38 and through the spacer blocks.

Means for fastening the ends of the connector bars 73 to the headstock and tailstock columns 12, 14 comprises, in the present instance, lateral projections 76 extending into the recesses 38 and formed on depending edge portions of the columns 12, 14. Threaded holes 77, alined with each other and the passages 75 in the spacer blocks, are formed in each projection to receive threaded end portions of the rods 73 so that the rods may be screwed into position in the projections. Additional holding means in the form of a transverse coupling pin 78 passing through the projections and the inserted end portions of the rods 73 may also be used to insure positive connection between the head stock and tailstock columns. Preferably, way guards 65 are used in conjunction with the connector rods 73 to provide both unitary movement of the columns and protection for the ways.

I claim as my invention:

1. In a machine tool of the type described, the combination of a pair of structurally separate bed frames arranged in superposed cruciform layout, the upper one of said bed frames having a continuous set of ways thereon for the reception of a reciprocating table, the underlying one of said bed frames having a plurality of upstanding ribs thereon and ways formed on said ribs for the reception in accurately alined position of headstock and tailstock columns located at opposite sides of the table ways, the top of said underlying bed frame and the sides of said ribs defining a recess therebetween, and spacer blocks positioned in said recess and having means for positioning said bed frames with the respective ways extending in precisely determined right angular relation, said blocks having a height relative to the height of the said recess to support the overlying portion of said upper bed against sagging in precisely determined upwardly spaced relation to said ways on the underlying bed frame, and having a width relative to the said recess to define a continuous passage for way guards above said ways and alongside said ribs on said underlying bed frame.

2. In a machine tool of the type described, the combination of a first integral bed frame of generally rectilinear outline having continuous guideways thereon for receiving an accurately alined position headstock and tailstock columns on opposite end portions thereof, a second integral bed frame of generally rectilinear outline having a set of continuous guideways thereon for receiving a reciprocable worktable, said second bed frame being positioned between the headstock and tailstock columns transversely of said first bed frame in overlying superposed relation thereto, said guideways on said first bed frame and the top of said bed frame defining recesses between said guideways, and spacer blocks position in said recesses in underlying relation to said second bed frame, said spacer blocks having means for positioning said bed frames with their respective guideways in precisely determined right angular relation, and having a height relative to the height of the said recesses to position said bed frames in accurate vertical relationship to each other.

3. In a machine tool of the type described, the combination of a pair of structurally separate bed frames arranged in superposed cruciform layout, the upper one of said bed frames having a continuous set of table ways thereon for the reception of a reciprocating table, and the underlying bed frame having a continuous set of ways thereon for the reception in accurately alined position of headstock and tailstock columns located at opposite sides of the table ways, spacer blocks positioned between the said ways of said underlying bed frame for rigidly supporting said upper bed frame in such cruciform layout with the respective ways of said bed frames extending in precisely determined vertical relation, and locating pins between said spacer blocks and said respective bed frames for positioning said respective ways in precisely determined right angular relation.

4. In a machine tool of the type described, the combination comprising a pair of structurally separate beds arranged in superposed cruciform layout, each of said beds having a continuous set of guideways on the upper surface thereof, a worktable having bearing means for reciprocation thereof on the said guideways of the upper one of said beds in a direction transversely of the lower one of said beds, a pair of vertical tool supporting columns on said lower bed having bearing means for movement on the said guideways of said lower bed, said columns being located on respective sides of said upper bed, means for rigidly supporting said beds in such cruciform layout with their respective guideways extending in precisely determined right angular relation and in vertical spaced relation to provide a clearance space between the lower surface of said upper bed and the surface of said guideways on said lower bed, a set of way guards mounted on one of said columns and extending above said guideways of said lower bed and into the clearance space between said guideways and the lower surface of said upper bed.

5. In a machine tool of the type described, the combination of a pair of structurally separate bed frames arranged in superposed cruciform layout, the upper one of said bed frames having a continuous set of ways thereon for the reception of a reciprocating table, the underlying one of said bed frames having a plurality of upstanding ribs thereon and ways formed on said ribs for the reception in accurately alined position of a pair of tool supporting columns located at opposite sides of the table ways, the top of said underlying bed frame and the sides of said ribs defining a recess therebetween, spacer block means positioned in said recess for positioning said bed frames with the respective ways extending in precisely determined vertical and right angular relation, said spacer block means being adapted to provide a passage under said upper bed frame adjacent said guideways on said underlying bed frame, and connector means received in the passage for interconnecting said tool supporting columns for unitary movement of the latter.

6. In a machine tool of the type described, the combination comprising a pair of structurally separate bed frames arranged in superposed cruciform layout, each of said bed frames having a continuous set of guideways on the upper surface thereof, a worktable having bearing means for reciprocation thereof on the said guideways of the upper one of said bed frames in a direction transversely of the lower one of said bed frames, a pair of vertical tool supporting columns on said lower bed frame having bearing means for movement on the said guideways of said lower bed to and from said upper bed frame, said columns being located on respective sides of said upper bed frame, means for rigidly supporting said bed frame in such cruciform layout with their respective guideways extending in precisely determined right angular relation and in vertical spaced relation to provide a clearance space between the lower surface of said upper bed frame and the surface of said guideways on said lower bed frame, a set of way guards mounted on one of said columns and extending above said guideways of said lower bed frame and into the clearance space between said guideways and the lower surface of said upper bed frame, and means on the respective end portions of said way guards for fastening said way guards to said tool supporting columns to interconnect the latter for unitary movement on the guideways of said lower bed frame.

7. In a machine tool of the type described, the combination of a pair of structurally separate beds arranged in superposed cruciform layout, the upper one of said beds having a continuous set of ways thereon for the reception of a reciprocating table, the underlying one of said beds having a plurality of upstanding ribs thereon and guideways formed on said ribs for the reception in accurately alined position of movable headstock and tailstock columns located at opposite sides of the table ways, the top of said underlying bed frame and the sides of said ribs defining a recess therebetween, spacer blocks positioned in said recess and having means for positioning said beds with the respective ways extending in precisely determined right angular relation, said blocks having a height relative to the height of the said recesses to support the overlying portion of said upper bed against sagging in precisely determined upwardly spaced relation to said guideways on the underlying bed frame, and a connector bar positioned in said recess and having means on its opposite end portions for connection to the lower portions of said headstock and tailstock columns to interconnect the latter for unitary movement, said blocks defining a passage for reception of said connector bar for free axial movement therethrough as said headstock and tailstock columns are moved on said underlying bed.

8. In a machine tool of the type described, the combination of a pair of structurally separate bed frames arranged in superposed cruciform layout, the upper one of said beds having a continuous set of ways thereon for the reception of a reciprocating table, the underlying one of said beds having a plurality of upstanding ribs thereon and guideways formed on said ribs for the reception in accurately alined position of headstock and tailstock columns located at opposite sides of the table ways, the top of said underlying bed frame and the sides of said ribs defining a recess therebetween, a spacer block positioned in said recess and having means for positioning said beds with the respective ways extending in precisely determined right angular relation, said block having a height relative to the height of the said recesses to support the overlying portion of said upper bed against sagging in precisely determined upwardly spaced relation to said guideways on the underlying bed frame, and having a width relative to the said recesses to define a continuous passage for reception of way guards above said guideways and alongside said ribs on said underlying bed frame, and a connector bar positioned in said recess for interconnecting said tool supporting columns to provide unitary movement thereof, said block having a passage therethrough for reception of said connector bar for free axial movement thereof in said recess.

References Cited in the file of this patent

UNITED STATES PATENTS

| | | |
|---|---|---|
| 1,936,384 | Davis | Nov. 21, 1933 |
| 1,942,092 | Gallimore | July 2, 1934 |
| 2,375,408 | Gallimore et al. | May 8, 1945 |
| 2,648,999 | Stephan | Aug. 18, 1953 |